US007890594B2

(12) United States Patent
Da Palma et al.

(10) Patent No.: US 7,890,594 B2
(45) Date of Patent: Feb. 15, 2011

(54) METHOD AND SYSTEM FOR DYNAMIC CONDITIONAL INTERACTION IN A VOICEXML RUN-TIME SIMULATION ENVIRONMENT

(75) Inventors: William V. Da Palma, Coconut Creek, FL (US); Brett J. Gavagni, Coconut Creek, FL (US); Matthew W. Hartley, Boynton Beach, FL (US); Brien H. Muschett, Palm Beach Gardens, FL (US)

(73) Assignee: Nuance Communications, Inc., Burlington, MA (US)

( * ) Notice: Subject to any disclaimer, the term of this patent is extended or adjusted under 35 U.S.C. 154(b) by 283 days.

(21) Appl. No.: 12/197,659

(22) Filed: Aug. 25, 2008

(65) Prior Publication Data

US 2009/0012795 A1   Jan. 8, 2009

Related U.S. Application Data

(62) Division of application No. 10/734,557, filed on Dec. 12, 2003, now Pat. No. 7,424,433.

(51) Int. Cl.
G06F 15/16 (2006.01)

(52) U.S. Cl. .................... 709/206; 709/227; 709/237; 704/270.1; 379/88.01

(58) Field of Classification Search ................ 704/270, 704/270.1, 275; 709/206, 227, 237; 379/88.01
See application file for complete search history.

(56) References Cited

U.S. PATENT DOCUMENTS

| 5,003,577 | A | * | 3/1991 | Ertz et al. | ................ 379/88.13 |
|---|---|---|---|---|---|
| 5,440,719 | A | * | 8/1995 | Hanes et al. | .................. 703/21 |
| 5,493,606 | A | * | 2/1996 | Osder et al. | ............. 379/88.05 |
| 5,513,298 | A | * | 4/1996 | Stanford et al. | ............. 704/243 |
| 5,771,276 | A | * | 6/1998 | Wolf | ....................... 379/88.16 |
| 5,794,205 | A | * | 8/1998 | Walters et al. | .............. 704/275 |
| 5,950,167 | A | * | 9/1999 | Yaker | ......................... 704/275 |
| 6,185,535 | B1 | * | 2/2001 | Hedin et al. | ................ 704/270 |
| 6,314,402 | B1 | | 11/2001 | Monaco et al. | |
| 6,321,198 | B1 | * | 11/2001 | Hank et al. | ................. 704/270 |
| 6,487,277 | B2 | | 11/2002 | Beyda et al. | |
| 6,516,051 | B2 | | 2/2003 | Sanders | |
| 2006/0203980 | A1 | * | 9/2006 | Starkie | .................... 379/88.18 |

OTHER PUBLICATIONS

Anonymous Author, VoiceGenie Announces Rich Voice XML Integrated Development Environment, pp. 1-2, *Technology Marketing Corporation*, (visited Sep. 23, 2003) http://www.tmcnet.com/enews/092601b.htm.

* cited by examiner

*Primary Examiner*—Vijay B Chawan
(74) *Attorney, Agent, or Firm*—Wolf, Greenfield & Sacks, P.C.

(57) ABSTRACT

A method and system for testing voice applications, such as VoiceXML applications, is provided. The system provides a run-time simulation environment for voice applications that simulates and automates user interaction. A user simulation script is provided in a customized mark-up language. The voice application is processed to derive a nominal output of the voice application. The user simulation script is processed to generate a simulated output for the voice application corresponding to the nominal output. Conditional logic may be applied to the nominal output to generate a simulated input in response thereto. The user simulation script is specified in a customized mark-up language having a set of one or more conditional tags and an internal variable for the nominal output of the voice application.

12 Claims, 3 Drawing Sheets

METHOD AND SYSTEM FOR DYNAMIC CONDITIONAL INTERACTION IN A VOICEXML RUN-TIME SIMULATION ENVIRONMENT

CROSS-REFERENCE TO RELATED APPLICATIONS

This application is a Division of U.S. application Ser. No. 10/734,557, filed Dec. 12, 2003, which is incorporated herein by reference in its entirety.

BACKGROUND OF THE INVENTION

1. Statement of the Technical Field

The present invention relates to the field of computer speech recognition, text to-speech technology and telephony, and more particularly to a system and method for a run-time simulation environment for voice applications that simulates and automates user interaction.

2. Description of the Related Art

Functionally testing voice applications presents many difficulties. In the case of a VoiceXML (VXML) application, a VXML interpreter communicates with a platform that supplies the necessary speech technology needed to test the application in realtime. These speech technologies, such as an automatic speech recognition (ASR) engine, or a text-to-speech (TIS) engine or converter, are generally very CPU intensive and expensive to build and install. In addition to the speech technologies, to test a voice application a tester must also provided the input to the application. This usually requires a tester to physically perform the interaction, in the form of actual speech or key tone input, which may be cumbersome and difficult to provide. Having a person perform the input can be time consuming and costly.

Furthermore, when testing a voice application, it can be difficult to mimic the true behavior of speech or audio input to the application, as well as any text-to-speech or pre-recorded audio output from the application. When testing voice applications, it may be necessary to test for dynamic and conditional interaction between the voice application dialog and the user. For example, the voice application dialog may prompt a user for an input, which input may vary according to certain conditions existing at the time the user makes the input.

It would be desirable therefore to provide a testing environment that allows the simulation of user interaction as well as the simulation of the speech technology platform, such that a developer of voice applications will no longer be dependent on human testers and speech technology and hardware to test their applications. The testing environment would therefore be a "simulation environment" that would adequately replace the user and speech technologies. To simulate a robust voice application, it would be necessary to provide a simulation environment that allowed for user interaction under varying conditions. It would be desirable therefore, to provide a simulation environment that could simulate conditional user interaction.

SUMMARY OF THE INVENTION

The present invention addresses the deficiencies of the art in respect to testing voice applications and provides a novel and non-obvious method, system and apparatus for a dynamic run-time simulation environment for voice applications that simulates and automates conditional user interaction. Methods consistent with the present invention provide a method for simulating a dynamic run-time user interaction with a voice application. A user simulation script programmed to specify simulated voice interactions with the voice application is loaded. The voice application is first processed to derive a nominal output of the voice application. The user simulation script is second processed to generate a simulated output for the voice application corresponding to the nominal output. Next, the user simulation script is third processed to generate a first simulated input for the voice application corresponding to a first pre-determined user input to the voice application, if the nominal output satisfies a first condition. Or, the user simulation script is fourth processed to generate a second simulated input for the voice application corresponding to a second pre-determined user input to the voice application, if the nominal output satisfies a second condition different from the first condition.

Systems consistent with the present invention include a simulation tool for simulating a dynamic run-time user interaction with a voice application running on an application server. The tool is configured to load a user simulation script programmed to specify simulated voice interactions with the voice application and to process the voice application to derive a nominal output of the voice application. The tool is further configured to process the user simulation script to generate a simulated output for the voice application corresponding to the nominal output. If the nominal output satisfies a first condition, the tool is configured to process the user simulation script to generate a first simulated input for the voice application corresponding to a first pre-determined user input to the voice application. If the nominal output satisfies a second condition different from the first condition, the tool is configured to generate a second simulated input for the voice application corresponding to a second pre-determined user input to the voice application.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

Figure 1:
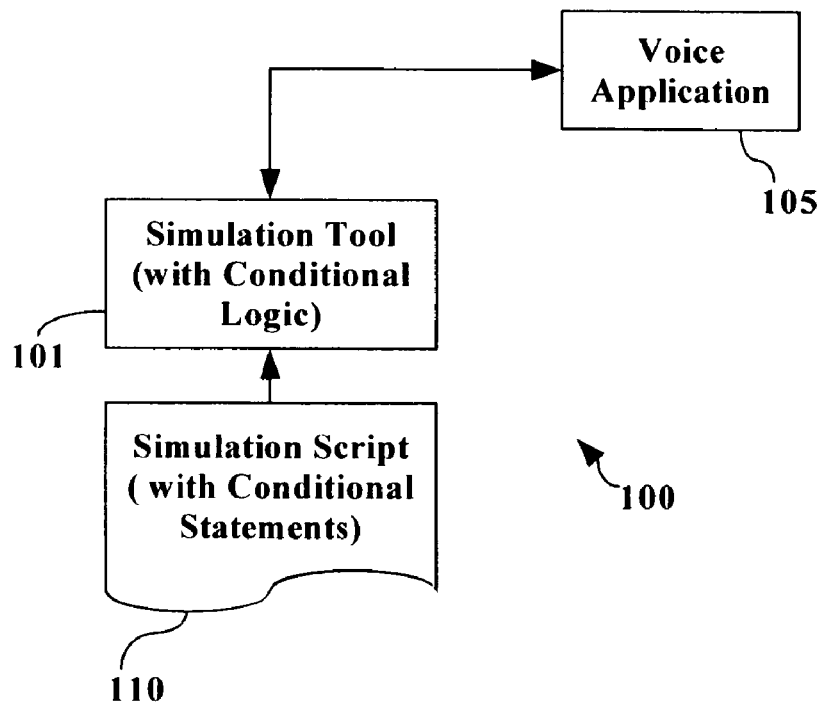
FIG. 1 is a conceptual drawing of the present invention which provides a user interaction simulation environment for a voice application.

The present invention is a system and method for simulating a run-time user interaction with a voice application. FIG. 1 is a conceptual drawing of the present invention which provides a user interaction simulation environment for a voice application. The simulation environment 100 of the present invention includes a simulation tool 101 that is coupled to a voice application 105. The simulation tool 101 uses conditional logic to process conditional statements in a simulation script 110 that provides a set of specified inputs and outputs to and from the voice application, to simulate a real-time interaction by a user with the voice application. The simulation tool 101 and script 110 replace the actual inputs that may be provided by a live user, and replace the actual outputs that may be provided by the voice application 101 and all the speech technologies that are otherwise coupled to a conventional voice application.

As used herein, a "voice application" shall mean any logic permitting user interaction through a voice driven user interface, such as a mark-up language specification for voice interaction with some form of coupled computing logic. One example of a voice application is an application written in Voice Extensible Mark-up Language, or "VoiceXML." However, it is readily understood that VoiceXML applications are not the only type of voice applications, and any reference to the term "VoiceXML application" herein shall encompass all voice applications.

In conventional voice systems, the voice application itself receives the "outputs" it generates to users from various speech technologies coupled to the voice application. For example, the voice application can receive an input from the user, and can record the input with an audio device, or convert the spoken word input into text using an automatic speech recognition engine. The voice application can then playback the recorded audio to the user as a prompt, or may convert a text stream to audio using the text-to-speech capabilities of a speech technologies platform, either of which may be sent as another "output" to the user.

Heretofore, to test a voice application, all of the foregoing speech processing elements are needed. The present invention replaces a number of those elements, by providing a simulation environment that allows a voice application to be executed in real-time, and that supplies and simulates the execution time of the inputs and outputs that flow to and from the voice application. Furthermore, the simulated inputs provided by the simulation environment can utilize conditional statements and conditional logic to provide a dynamic interaction with the voice application.

Figure 2:
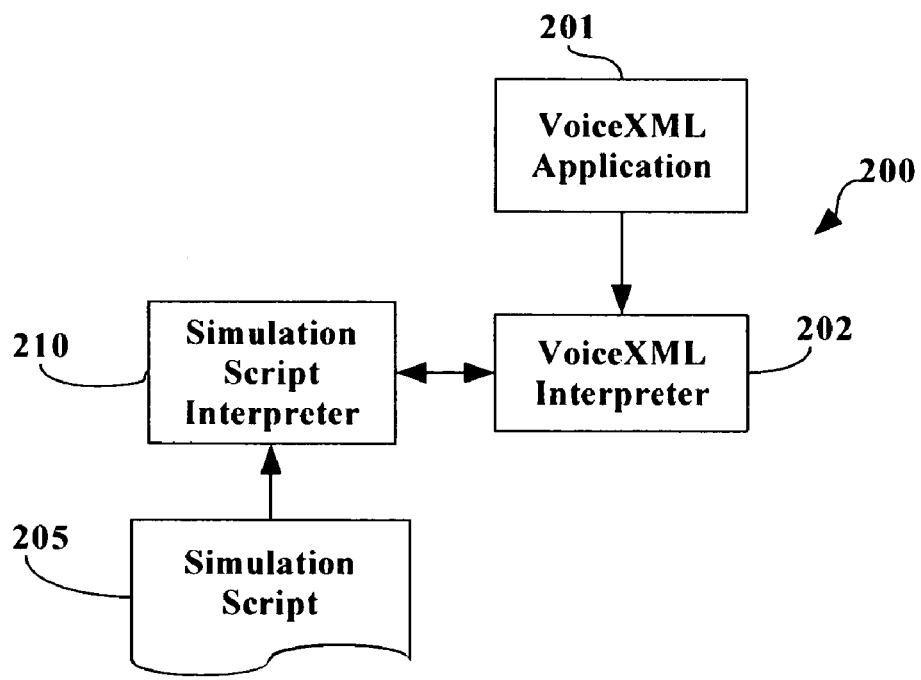
FIG. 2 is a block diagram showing the arrangement of elements in a system assembled in accordance with the principles of the present invention for simulating a run-time environment with a voice application.

The present invention is a method, system and apparatus for dynamic conditional interaction in a voice application run-time simulation environment. In accordance with the present invention, a user simulation script for exercising the run time environment of a voice application can be provided. The simulation script can be processed by a simulation script interpreter to provided simulated audible input into the voice application in order to test the operation of the voice application without requiring a human applications tester to manually speak input into the voice application. Importantly, the simulation script can include one or more conditional statements that can be resolved by applying conditional logic. In this regard, the conditional tags can trigger a conditional statement in the script interpreter in which the input provided to the voice application can vary based upon the resolution of the conditional logic. In further illustration of the inventive arrangements, FIG. 2 is a block diagram illustrating a system for dynamic conditional interaction in a voice application run-time simulation environment. The system 200 can include a voice application interpreter 202 operating in association with a voice application 201. The voice application interpreter 202 can be configured to process the voice application 201 comprised of instructions for directing the management of voice interactions with an end user and application logic disposed within an application server (not shown). The system 200 also includes a simulation script 205 that can be interpreted by a second interpreter 210. The second interpreter 210 may reside on a separate piece of hardware, or may be resident on the same hardware as the voice application 201 and interpreter 202.

The simulation environment 200 can process customized mark-up language documents which describe the user interaction or the user experience with the environment itself. Specifically, the mark-up language documents describe the set of operations a user might take as a transcript of what occurs when interacting with the voice application. In this regard, what is the desired to be simulated is the behavior between the user and the voice application, which is provided by the simulation script 205 written in the customized mark-up language, which, by way of non-limiting example, may be called a "Voice User Interaction Extensible Mark-up Language," or "VuiXML." The user behavior, as well as the prompts and outputs supplied from the voice application itself, is mimicked and embodied in the user simulation script 205.

The user simulation script 205 can be a script that describes how the user interacts with the system. Common interaction behaviors can include voice response, input in the form of digits, pauses between spoken words, hang-up operations, typical inputs that a user would make when interacting with a voice response system. This user interaction is embodied in the script.

Figure 3:
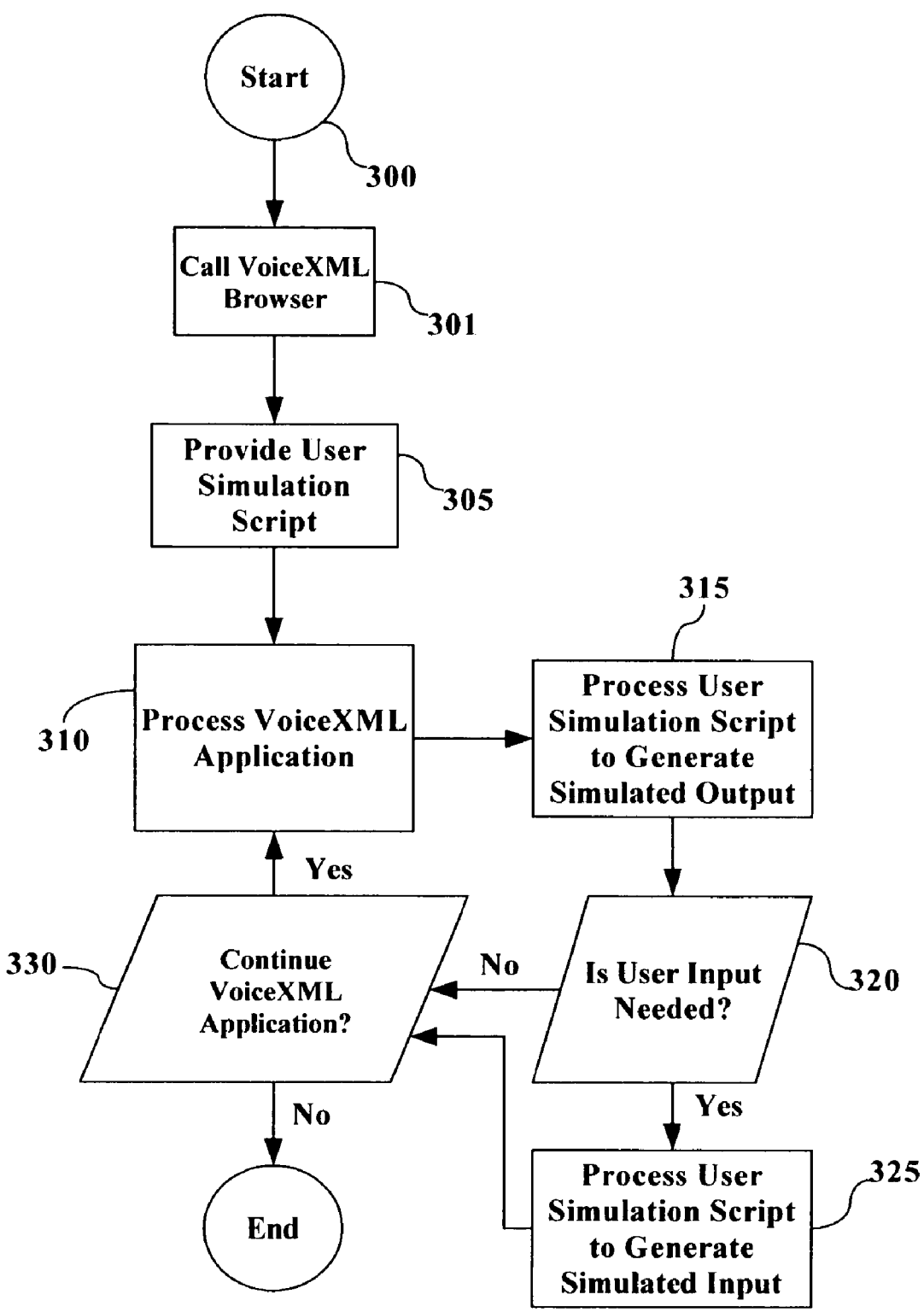
FIG. 3 is a flowchart illustrating a process for simulating a run-time user interaction with a voice application.

FIG. 3 is a flowchart illustrating a process for simulating a run-time user interaction with a voice application. First, the voice application browser, such a VoiceXML browser, is called in step 301. Next, in step 305, a user simulation script is provided and supplied to the simulation environment. Subsequently, the voice application is processed in step 310.

The voice application normally generates one or more outputs, which, in conventional systems, may be prompts, synthesized text to speech, pre-recorded audio, and the like. However, in the simulation environment, all such outputs are text based, and are initially "nominal" outputs: the outputs that the voice application would otherwise provide to a user in the non-simulated environment. Within the simulation environment, the actual outputs for the voice application are instead generated by the user simulation script, which generates a simulated output for the voice application corresponding to the nominal output. This occurs in step 315.

In step 320, the process next determines whether the voice application requires a user input. Should the voice application require a user input, the user simulation script is processed in step 325 to generate a simulated input for the voice application corresponding to a pre-determined user input to the voice application. As stated above, all such input is pre-developed and supplied in the user simulation script. The process may then choose to continue after assessing whether additional processing of the voice application is necessary in step 330, or may terminate if execution of the voice application is complete. In accordance with the present invention, the voice application simulation script interpreter can be further configured to process conditional operations within the voice application simulation script. In this regard, the voice application simulation script interpreter can be configured to process one or more conditional tags disposed within the voice application simulation script such as "<if>", "<else>", and "<elseif>". When encountering such conditional tags, the voice application simulation script interpreter can invoke conditional logic to resolve a suitable interaction to be performed in respect to the voice application.

Referring back to FIG. 1, the simulation tool 101 of the present invention creates a dynamic run-time environment for user interaction with a voice application by providing a user simulation script 110 that includes conditional tags and an internal variable for the output from the voice application. The user simulation script therefore includes one or more conditional statements that are resolved by applying conditional logic. One or more conditional tags, such as "<if>", "<else>", or "<elseif>" can be used to trigger a conditional statement containing one or more logical tests, which when resolved, produces a varying result that depends on the outcome of the logical test in the conditional statement.

Figure 4:
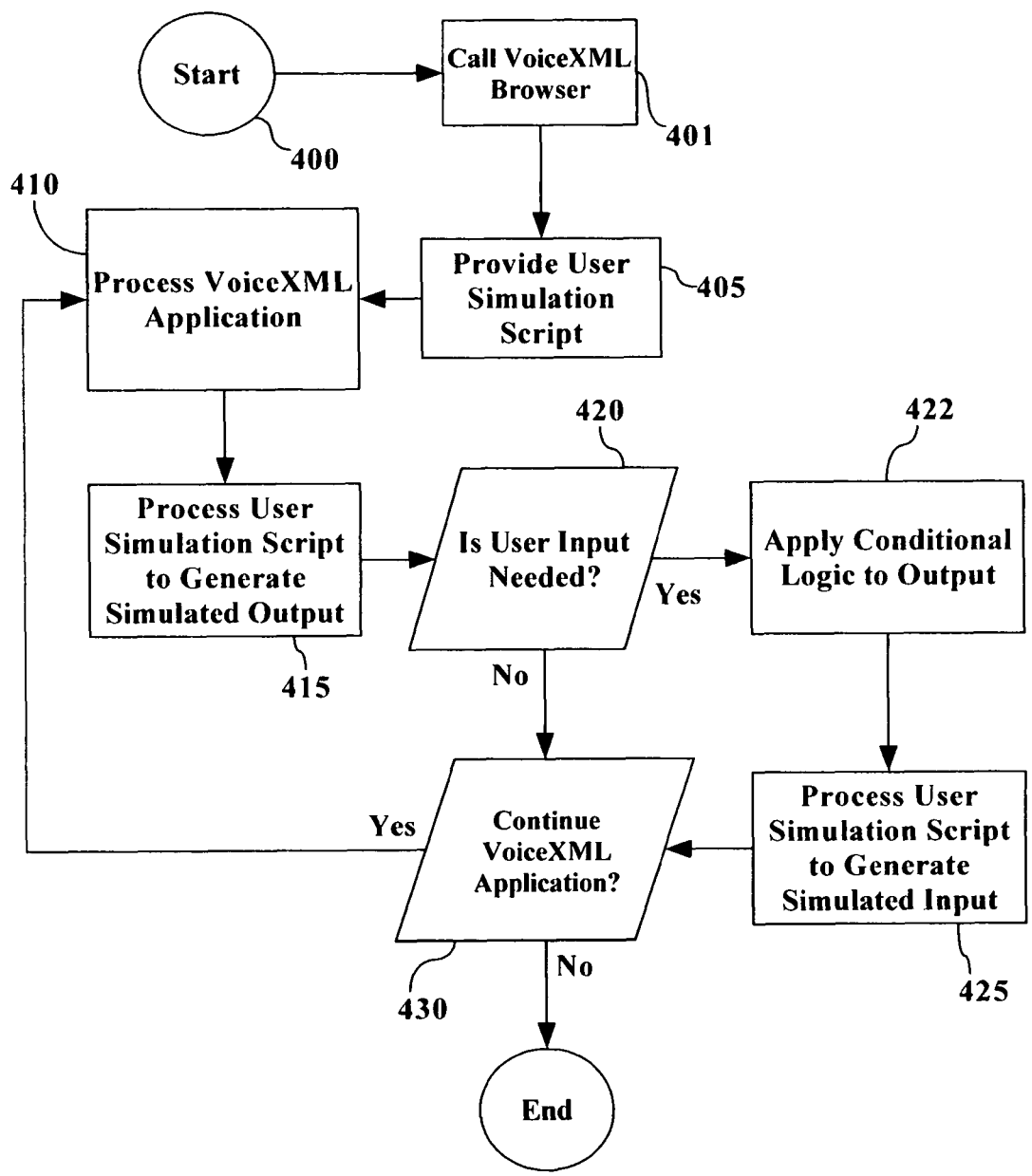
FIG. 4 is a flowchart illustrating a process for simulating conditional user interaction with a voice application.

To further illustrate the conditional logic of the voice application, FIG. 4 shows a flow chart illustrating a process for dynamically conditioning interactions in the voice application in the run-time simulation environment of FIG. 1. First, the voice application browser, such as the VoiceXML browser, is called in step 401. In step 405, a user simulation script 205 is provided and supplied to the simulation environment. Next, the voice application is processed in step 410 to generate one or more nominal outputs, which may be prompts, synthesized text to speech, pre-recorded audio, etc. The user simulation script is processed in step 315 to generate a simulated output for the voice application corresponding to the nominal output.

After determining whether the process requires a user input in response to the nominal output from the voice application in step 420, the simulation tool applies conditional logic to the nominal output in step 422. This is done by incorporating one or more conditional statements in the user simulation script and by setting an internal variable in the script to equal the nominal output. Each conditional statement includes a logical test which compares the nominal output to a pre-determined value using the internal variable, and produces a varying result depending on the outcome of the logical test.

This produces a dynamic environment where a first simulated input can be generated for the voice application in step 425, if, when applying and resolving the logical test in a first conditional statement in step 422, the nominal output satisfies the first condition. If the nominal output does not satisfy the first condition, or satisfies a second condition different from the first condition, a second simulated input for the voice application can be generated in step 425. Of course, either simulated input is predetermined and incorporated in the user simulation script. Therefore the first simulated input can correspond to a first pre-determined user input to the voice application, while the second simulated input can corresponds to a second pre-determined user input to the voice application. At step 430, the process may then choose to continue and proceed back to step 410 after assessing whether additional processing of the voice application is necessary. Or it may terminate if execution of the voice application is complete.

The present invention thereby allows a developer of a voice application to test the application by simulating the real-time flow of events between a user and a voice application. The simulated inputs and outputs are executed in conjunction with the voice application in real-time to test the application. This greatly aids in developing the voice application.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for simulating a run-time user interaction with a voice application, said method comprising acts of:
   loading a user simulation script programmed to specify simulated voice interactions with the voice application;
   deriving from the voice application a nominal output;
   generating a simulated output for the voice application corresponding to the nominal output; and
   conditionally producing a first simulated input for the voice application if and only if the nominal output satisfies a first condition.

2. The method of claim 1, wherein deriving from the voice application the nominal output comprises deriving an audible nominal output.

3. The method of claim 1, wherein generating the simulated output for the voice application corresponding to the nominal output comprises generating a simulated output that is text based.

4. The method of claim 1, wherein conditionally producing the first simulated input comprises conditionally producing a simulated input that is audible.

5. A machine readable storage having stored thereon a computer program for simulating a dynamic run-time user interaction with a voice application, said computer program comprising a routine set of instructions which when executed by a machine cause the machine to perform the steps of:
   loading a user simulation script programmed to specify simulated voice interactions with the voice application;
   deriving from the voice application a nominal output;
   generating a simulated output for the voice application corresponding to the nominal output;
   generating a first simulated input for the voice application corresponding to a first pre-determined user input to the voice application, if the nominal output satisfies a first condition; and
   generating a second simulated input for the voice application corresponding to a second pre-determined user input to the voice application, if the nominal output satisfies a second condition different from the first condition.

6. The machine readable storage of claim 5, wherein the user simulation script is specified in a customized mark-up language, the customized mark-up language having a set of one or more conditional tags.

7. The machine readable storage claim 6, wherein the customized mark-up language includes an internal variable for nominal output of the voice application.

8. The machine readable storage claim 7, further causing said machine to perform the steps of:
   setting the internal variable to equal the nominal output of the voice application;
   resolving a first conditional statement using a first conditional tag to generate the first simulated input if the internal variable equals a first nominal output of the voice application; and
   resolving a second conditional statement using a second conditional tag to generate the second simulated input if the internal variable equals a second nominal output of the voice application.

9. A simulation tool for simulating a dynamic run-time user interaction with a voice application running on an application server, said tool being configured to load a user simulation script programmed to specify simulated voice interactions with the voice application, and to: (i) process the voice application to derive a nominal output of the voice application; (ii) process the user simulation script to generate a simulated output for the voice application corresponding to the nominal output; (iii) process the user simulation script to generate a first simulated input for the voice application corresponding to a first pre-determined user input to the voice application, if the nominal output satisfies a first condition; and (iv) process the user simulation script to generate a second simulated input for the voice application corresponding to a second predetermined user input to the voice application, if the nominal output satisfies a second condition different from the first condition.

10. The simulation tool of claim 9, wherein the user simulation script is specified in a customized mark-up language, the customized mark-up language having a set of one or more conditional tags.

11. The simulation tool of claim 10, wherein the customized mark-up language includes an internal variable for nominal output of the voice application.

12. The simulation tool of claim 11, wherein the simulation tool is further configured to: (i) set the internal variable to equal the nominal output of the voice application; (ii) resolve a first conditional statement using a first conditional tag to generate the first simulated input if the internal variable equals a first nominal output of the voice application; and (iii) resolve a second conditional statement using a second conditional tag to generate the second simulated input if the internal variable equals a second nominal output of the voice application.

\* \* \* \* \*